(12) United States Patent
Hamagishi

(10) Patent No.: US 8,773,601 B2
(45) Date of Patent: Jul. 8, 2014

(54) DISPLAY DEVICE AND ELECTRONIC APPARATUS

(75) Inventor: Goro Hamagishi, Osaka (JP)

(73) Assignee: Japan Display West Inc., Chita-gun, Aichi-ken (JP)

(*) Notice: Subject to any disclaimer, the term of this patent is extended or adjusted under 35 U.S.C. 154(b) by 98 days.

(21) Appl. No.: 13/048,084

(22) Filed: Mar. 15, 2011

(65) Prior Publication Data
US 2011/0228185 A1    Sep. 22, 2011

(30) Foreign Application Priority Data
Mar. 19, 2010  (JP) ............... P2010-063870

(51) Int. Cl.
G02F 1/1335    (2006.01)
G02F 1/1343    (2006.01)

(52) U.S. Cl.
USPC ............................ 349/15; 349/139

(58) Field of Classification Search
USPC ........................................... 349/15
See application file for complete search history.

(56) References Cited

U.S. PATENT DOCUMENTS

| | | | |
|---|---|---|---|
| 6,970,290 B1 | 11/2005 | Mashitani et al. | |
| 2006/0098281 A1* | 5/2006 | Fukushima et al. | 359/464 |
| 2006/0139234 A1* | 6/2006 | Tanaka | 345/9 |
| 2008/0165296 A1* | 7/2008 | Kim et al. | 349/15 |
| 2011/0007390 A1 | 1/2011 | Yanamoto | |
| 2011/0170026 A1* | 7/2011 | Lin | 349/15 |

FOREIGN PATENT DOCUMENTS

| | | |
|---|---|---|
| JP | 2001-166259 | 6/2001 |
| JP | 2011-017788 | 1/2011 |

OTHER PUBLICATIONS

Kaplan, Sam H., Theory of Parallax Barriers, vol. 59, Journal of the SMPTE, 1952.*
Japanese Office Action issued Jul. 2, 2013 in corresponding Japanese Patent Application No. 2010-063870.

* cited by examiner

*Primary Examiner* — Bumsuk Won
*Assistant Examiner* — Charles Chang
(74) *Attorney, Agent, or Firm* — K&L Gates LLP

(57) ABSTRACT

A display device includes: an image display unit having a plurality of pixels each including a plurality of sub-pixels with colors different from one another, the sub-pixels displaying an image for a right eye and an image for a left eye; and a light shielding unit configured to cause parallax to be generated between the two eyes. In the image display unit, each of the sub-pixels is substantially square and arranged in such a manner as to correspond to a corresponding lattice point of a triangular lattice. In the light shielding unit, a shape of a light shielding barrier in a state in which a display device body is oriented in a vertical direction is different from a shape of the light shielding barrier in a state in which the display device body is oriented in a horizontal direction.

9 Claims, 7 Drawing Sheets

DISPLAY DEVICE AND ELECTRONIC APPARATUS

CROSS REFERENCES TO RELATED APPLICATIONS

The present application claims priority to Japanese Priority Patent Application JP 2010-063870 filed in the Japan Patent Office on Mar. 19, 2010, the entire contents of which are hereby incorporated by reference.

BACKGROUND

The present application relates to display devices and electronic apparatuses.

Examples of existing devices for displaying stereoscopic images without using a special pair of glasses include a device in which, by providing a parallax barrier or lenticular lenses on the viewer side display surface of a display panel, such as a liquid crystal panel, stereoscopic images can be viewed through separation of light beams from images for the right eye and left eye alternately displayed on every other vertical line of a display screen (refer to Japanese Unexamined Patent Application Publication No. 2001-166259, for example).

SUMMARY

However, in such a display device described above, since the aspect ratio of the shapes of pixels displaying images is not one, there is a problem in that an appropriate viewing distance for satisfactory stereoscopic image viewing changes in accordance with whether the display device is oriented in a vertical or horizontal direction.

In view of the above situation, it is desirable to provide a display device and an electronic apparatus which enable a viewer to view a stereoscopic image without changing their position irrespective of whether the device or apparatus is oriented in a vertical or horizontal direction.

A display device according to an embodiment includes: image display means, having a plurality of pixels each including a plurality of sub-pixels with colors different from one another, the sub-pixels displaying an image for a right eye and an image for a left eye; and light shielding means for causing parallax to be generated between the two eyes. In the image display means, each of the sub-pixels is substantially square and arranged in such a manner as to correspond to a corresponding lattice point of a triangular lattice. In the light shielding means, a shape of a light shielding barrier in a state in which a display device body is oriented in a vertical direction is different from a shape of the light shielding barrier in a state in which the display device body is oriented in a horizontal direction.

According to the display device of an embodiment, since the sub-pixels of the image display means are substantially square-shaped, there is no change in the pitch of the sub-pixels between the cases of vertical orientation and horizontal orientation, and an appropriate viewing distance allowing a viewer to view high quality stereoscopic images is prevented from changing. In addition, since barrier shapes corresponding to vertical orientation and horizontal orientation are set, the viewer is able to view high quality stereoscopic images without changing their position for viewing stereoscopic images both at the time of vertical orientation and horizontal orientation.

In the above-described display device, it is preferable that the plurality of sub-pixels be arranged in a line along a first direction and the line of sub-pixels be arranged in a plurality along a second direction perpendicular to the first direction, and that an arrangement pattern of the sub-pixels of an odd-numbered line be different from an arrangement pattern of an even-numbered line.

According to this configuration, since three sub-pixels corresponding to the colors R, G, and B of images for the right eye and left eye are arranged in the vicinity of one another, a viewer can view a high quality image.

In the above-described display device, it is preferable that, in the light shielding means, barrier openings forming the shape of the light shielding barrier in the vertical orientation state be arranged in a zigzag pattern, and barrier openings forming the shape of the light shielding barrier in the horizontal orientation state be arranged in a stripe pattern.

According to this configuration, the positions of the barrier openings can be made to correspond to the positions of sub-pixels both at the time of vertical orientation and horizontal orientation. Hence, a viewer can view a high quality stereoscopic image both at the time of vertical orientation and horizontal orientation, as described above.

In the above-described display device, it is preferable that the light shielding means be formed of a liquid crystal panel in which a liquid crystal layer is sandwiched between a pair of substrates, and that a shape of a first electrode provided on a liquid crystal layer side of one of the pair of substrates correspond to the shape of the light shielding barrier in the vertical orientation state, and a shape of a second electrode provided on the liquid crystal layer side of the other of the pair of substrates correspond to the shape of the light shielding barrier in the horizontal orientation state.

According to this configuration, a light shielding barrier for vertical orientation and a light shielding barrier for horizontal orientation can be formed using a single liquid crystal panel, thereby enabling reductions in the number of components and the size of the device.

An electronic apparatus according to another embodiment includes the above-described display device.

According to an electronic apparatus according to an embodiment, since the apparatus includes the above-described display device, a highly reliable electronic apparatus is realized which allows a viewer to view high quality stereoscopic images without moving both at the time of vertical orientation and the time of horizontal orientation.

Additional features and advantages are described herein, and will be apparent from the following Detailed Description and the figures.

DETAILED DESCRIPTION

Embodiments of the present application will be described below in detail with reference to the drawings.

Figure 1:
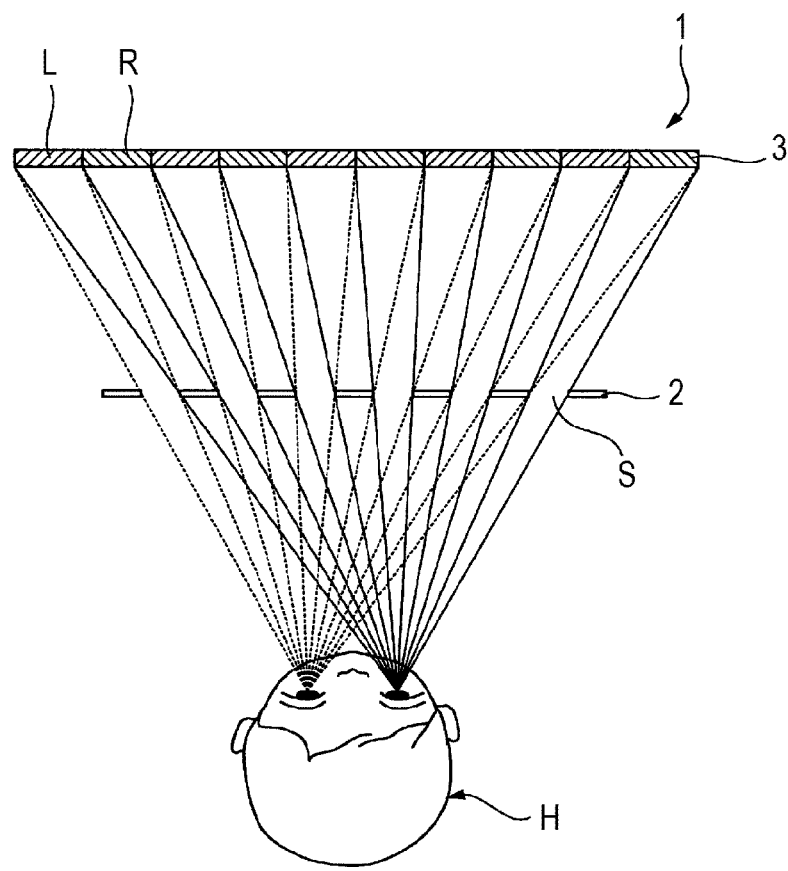
FIG. 1 illustrates a schematic configuration of a stereoscopic image display device.

Hereinafter, a display device and an electronic apparatus according to an embodiment are described with reference to the drawings. FIG. 1 illustrates a schematic configuration of a stereoscopic image display device (display device) using a parallax barrier as an example of a display device according to the present embodiment.

As illustrated in FIG. 1, a stereoscopic display device 1 includes a liquid crystal panel (image display means) 3, a light shielding barrier (light shielding means) 2. The liquid crystal panel 3, which has a configuration in which a liquid crystal layer is sandwiched between two glass substrates, includes a plurality of sub-pixels alternately displaying left-eye images L and right-eye images R. The light shielding barrier 2 is provided between the liquid crystal panel 3 and a viewer H as image separation means for spatially separating the left-eye images L and the right-eye images R.

The light shielding barrier 2 has a plurality of barrier openings S corresponding to the right-eye images R and the left-eye images L, and prevents the left-eye images L from being incident to the right eye of the viewer H and prevents the right-eye images R from being incident to the left eye of the viewer H.

Figure 2:
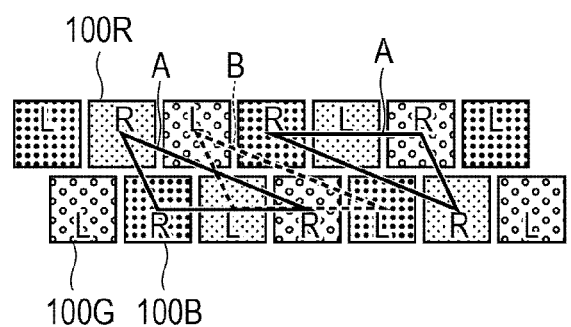
FIG. 2 is a plan view of a pixel arrangement in a liquid crystal panel.

FIG. 2 is a plan view illustrating a magnified view of a portion of the pixel arrangement in the liquid crystal panel 3. As illustrated in FIG. 2, sub-pixels 100R, 100G, and 100B respectively assigned color filters having red (R), green (G), and blue (B) colors are cyclically arranged along the horizontal direction (first direction). When viewed in the vertical direction (second direction), the sub-pixel arrangement patterns of odd-numbered lines are the same as those of even-numbered lines, and R, G, and B are arranged in this order from the left to right.

When viewing the whole pixel arrangement area in the liquid crystal panel 3, each of the sub-pixels 100R, 100G, and 100B (hereinafter, sometimes called sub-pixels 100) has a substantially square shape and is arranged in such a manner as to correspond to a corresponding lattice point of a triangular lattice (so called delta arrangement).

The sub-pixels 100R, 100G, and 100B described above display either the right-eye images R or the left-eye images L. Specifically, the right-eye images R and the left-eye images L are arranged alternately along the horizontal direction on a sub-pixel basis. Note that FIG. 2 corresponds to the sub-pixel arrangement in a state in which the liquid crystal panel 3 (stereoscopic display device 1) is oriented in a vertical direction.

The sub-pixels 100R, 100G, and 100B within an area denoted by a solid line A in FIG. 2 form one pixel for the right eye. The sub-pixels 100R, 100G, and 100B within an area denoted by a broken line B in FIG. 2 form one pixel for the left eye.

In the stereoscopic display device 1 according to the present embodiment, the shape of a light shielding barrier formed by the light shielding barrier 2 in a state of vertical orientation is different from the shape of a light shielding barrier formed by the light shielding barrier 2 in a state of horizontal orientation.

Figure 3:
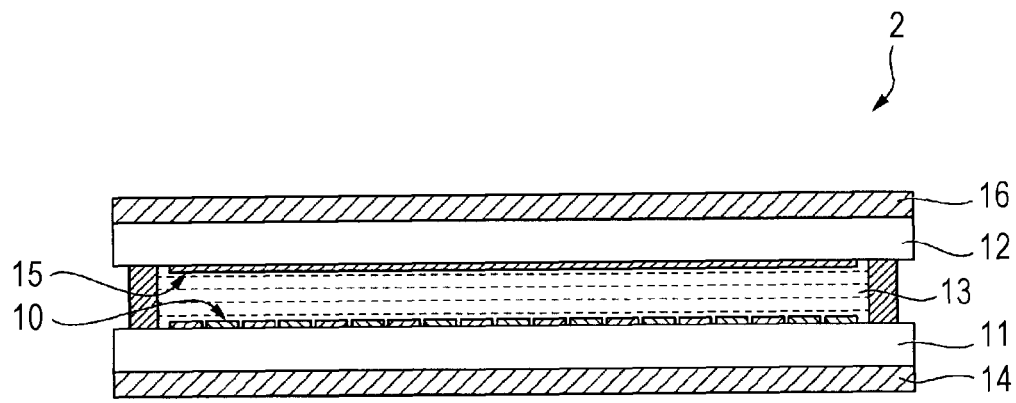
FIG. 3 illustrates a configuration of a light shielding barrier.

The light shielding barrier 2 is formed of a liquid crystal panel. FIG. 3 is a sectional view of the configuration of the light shielding barrier 2. Referring to FIG. 3, the light shielding barrier 2 is formed of two glass substrates (a pair of substrates) 11 and 12 with a liquid crystal layer 13 sandwiched therebetween. The external surfaces of the two glass substrates 11 and 12 are respectively provided with polarizing plates 14 and 16. Among the two polarizing plates 14 and 16, the polarizing plate 14, which is nearer to the liquid crystal panel 3 for displaying images, may be shared with the polarizing plate (not shown) of the liquid crystal panel 3. The polarizing plates 14 and 16 are adhered such that the polarization axes thereof are perpendicular to each other. First electrodes 10 are provided on the inner side (the liquid crystal layer 13 side) of the glass substrate 11. Second electrodes 15 are provided on the inner side (the liquid crystal layer 13 side) of the other glass substrate 12. The first electrodes 10 and the second electrodes 15 are made of indium-tin oxide (ITO), for example.

Figure 4:
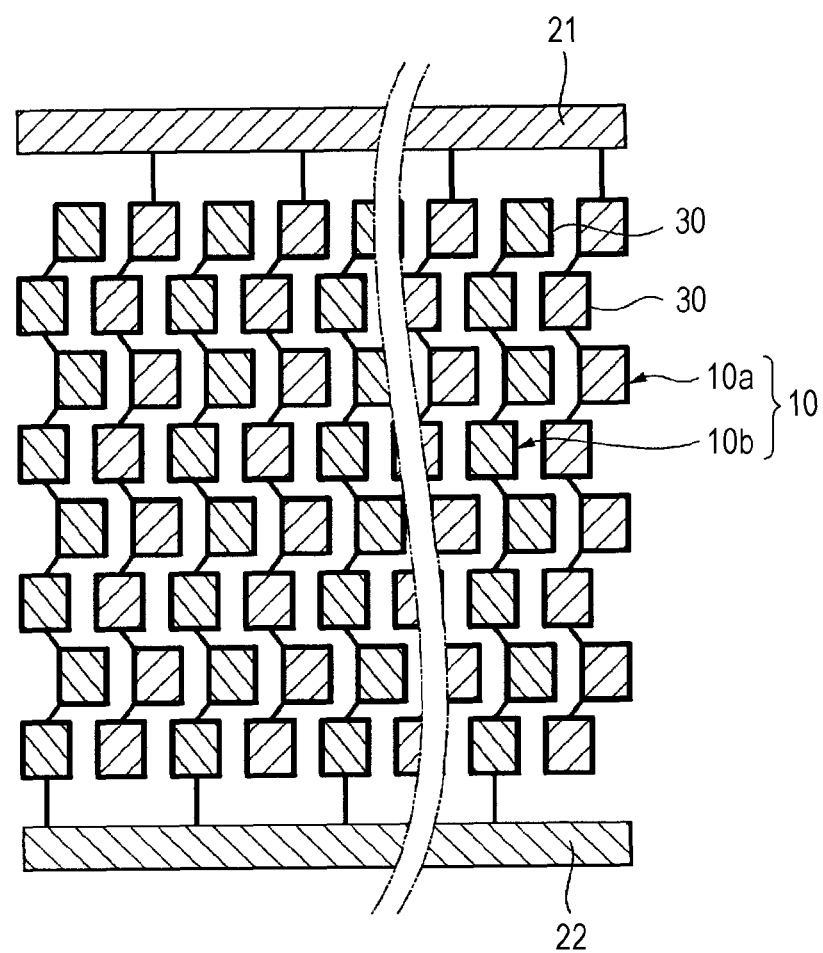
FIG. 4 is a plan view of a structure of a first electrode.

FIG. 4 is a plan view of the structure of the first electrodes 10 formed on the glass substrate 11. As illustrated in FIG. 4, each of the first electrodes 10 includes a vertical-orientation driving electrode part 10a for the time of vertical orientation and a horizontal-orientation driving electrode part 10b for the time of horizontal orientation. The vertical-orientation driving electrode part 10a and the horizontal-orientation driving electrode part 10b are electrically insulated from each other.

Each of the vertical-orientation driving electrodes 10a includes a plurality of substantially square-shaped square electrodes 30 which are arranged in a zigzag pattern and electrically connected to one another. The square electrodes 30 function as the barrier openings S of the light shielding barrier 2 (refer to FIG. 1). Each of the horizontal-orientation driving electrode parts 10b, similarly to the vertical-orientation driving electrode 10a, includes a plurality of the square electrodes 30, which are arranged in a zigzag pattern and electrically connected to one another. Note that the vertical-orientation driving electrode parts 10a and the horizontal-orientation driving electrode parts 10b are alternately formed, and thereby the first electrodes 10 are arranged substantially over the whole glass substrate 11.

The vertical-orientation driving electrode parts 10a and the horizontal-orientation driving electrode parts 10b are electrically connected respectively to a vertical-orientation driving unit 21 for the time of vertical orientation and the horizontal-orientation driving unit 22 for the time of vertical orientation, and can be driven independently. The vertical-orientation driving unit 21 and the horizontal-orientation driving unit 22 are formed of circuit units including switching circuits, for example.

On the basis of this structure, the vertical-orientation driving electrode parts 10a are configured to be driven when the stereoscopic display device 1 is oriented in the vertical direction. Unlike the vertical-orientation driving electrode parts 10a, the horizontal-orientation driving electrode parts 10b are configured to be driven only when the stereoscopic display device 1 is oriented in the horizontal direction. Note that the sizes and locations of the vertical-orientation driving electrode parts 10a are set such that the right-eye images R and the left-eye images L can be sufficiently separated at the time of vertical orientation.

Figure 5:
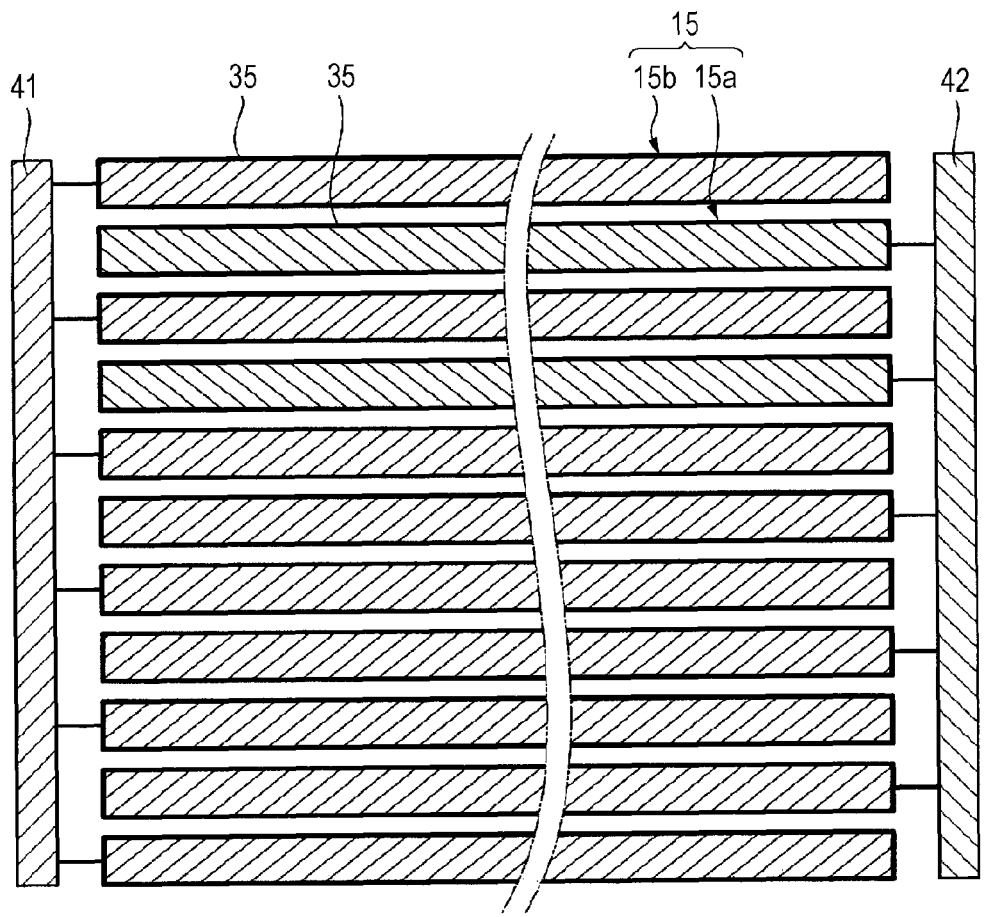
FIG. 5 is a plan view of a structure of a second electrode.

FIG. 5 is a plan view of the structure of the second electrodes 15 formed on the glass substrate 12. As illustrated in FIG. 5, each of the second electrodes 15 includes a horizontal-orientation driving electrode part 15*a* for the time of horizontal orientation and a vertical-orientation driving electrode part 15*b* for the time of vertical orientation. The horizontal-orientation driving electrode part 15*a* and the vertical-orientation driving electrode part 15*b* are electrically insulated from each other.

The horizontal-orientation driving electrode parts 15*a* include a plurality of rectangular electrodes 35 which are arranged in a stripe pattern and are electrically connected to one another. The rectangular electrodes 35 function as the barrier openings S of the light shielding barrier 2. Similarly to the horizontal-orientation driving electrode parts 15*a*, the vertical-orientation driving electrode parts 15*b* include a plurality of the rectangular electrodes 35 which are arranged in a stripe pattern and are electrically connected to one another. The horizontal-orientation driving electrode parts 15*a* and the vertical-orientation driving electrode parts 15*b* are alternately formed, and thereby the second electrodes 15 are arranged substantially over the whole glass substrate 12.

The horizontal-orientation driving electrode parts 15*a* and the vertical-orientation driving electrode parts 15*b* are electrically connected respectively to a horizontal-orientation driving unit 41 for the time of horizontal orientation and a vertical-orientation driving unit 42 for the time of vertical orientation, and can be driven independently. The horizontal-orientation driving unit 41 and the vertical-orientation driving unit 42 are formed of circuit units including switching circuits, for example.

On the basis of this structure, the horizontal-orientation driving electrode parts 15*a* are configured to be driven when the stereoscopic display device 1 is oriented in the horizontal direction. Unlike the horizontal-orientation driving electrode parts 15*a*, the vertical-orientation driving electrode parts 15*b* are configured to be driven only when the stereoscopic display device 1 is oriented in the vertical direction. Note that the sizes and locations of the horizontal-orientation driving electrode parts 15*a* are set such that the right-eye images R and the left-eye images L can be sufficiently separated at the time of horizontal orientation.

Figure 6:
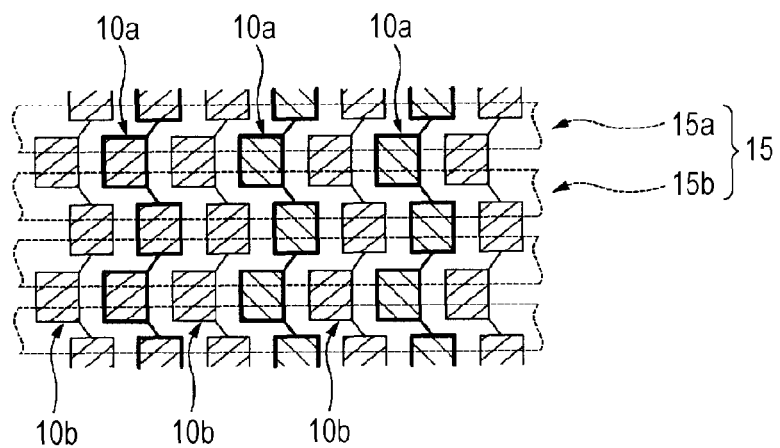
FIG. 6 is an illustration for explaining a driving state of a light shielding barrier at the time of vertical orientation.
Figure 7:
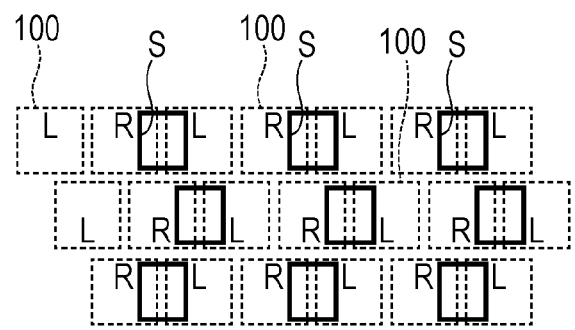
FIG. 7 illustrates a positional relationship between barrier openings and sub-pixels at the time of vertical orientation.

On the basis of this configuration, the light shielding barrier 2 can be configured to have different shielding barrier shapes in accordance with the orientation (at the time of vertical orientation or horizontal orientation) of the stereoscopic display device 1. FIG. 6 is an explanatory illustration of the driving state of the light shielding barrier 2 when the stereoscopic display device 1 is vertically oriented. FIG. 7 illustrates the positional relationship between the barrier openings formed by the light shielding barrier 2 and the sub-pixels at the time of vertical orientation.

When the stereoscopic display device 1 is vertically oriented, the light shielding barrier 2 activates only the vertical-orientation driving unit 21 on the glass substrate 11 side and also activates the horizontal-orientation driving unit 41 and the vertical-orientation driving unit 42 on the glass substrate 12 side. As a result, on the glass substrate 12 side, all the second electrodes 15 (denoted by broken lines) have the same potential, as illustrated in FIG. 6.

Here, the first electrodes 10 and the second electrodes 15 have the positional relationship illustrated in FIG. 6 when viewed in plan. Hence, a voltage can be applied across the vertical-orientation driving electrode parts 10*a* on the glass substrate 11 side and the second electrodes 15. Note that since FIG. 6 is a schematic diagram, there are gaps between the horizontal-orientation driving electrode parts 15*a* and the vertical-orientation driving electrode parts 15*b* which form the second electrodes 15. However, since the actual gaps are very small, a voltage can be effectively applied between the second electrodes 15 and the vertical-orientation driving electrode parts 10*a*. As a result, the polarization axis of the light polarized through the polarizing plate 14 is rotated by 90 degrees in accordance with the rotation of molecules of the liquid crystal in the liquid crystal layer 13 which is located between the vertical-orientation driving electrode parts 10*a* and the second electrodes 15, and the light then exits through the polarizing plate 16. At this time, since no voltage is applied between the horizontal-orientation driving electrode parts 10*b* and the second electrodes 15, the polarization axis of the light selected by the polarizing plate 14 is not rotated in the liquid crystal layer 13, and hence, the light does not pass through the polarizing plate 16.

As a result, the barrier openings S formed by the light shielding barrier 2 are arranged in a zigzag pattern corresponding to the pattern of the vertical-orientation driving electrode parts 10*a*, as illustrated in FIG. 7. Consequently, the right-eye images R and the left-eye images L displayed by the sub-pixels 100 can be sufficiently separated, thereby reliably enabling the viewer H to view the right-eye images R and the left-eye images L.

Figure 8:
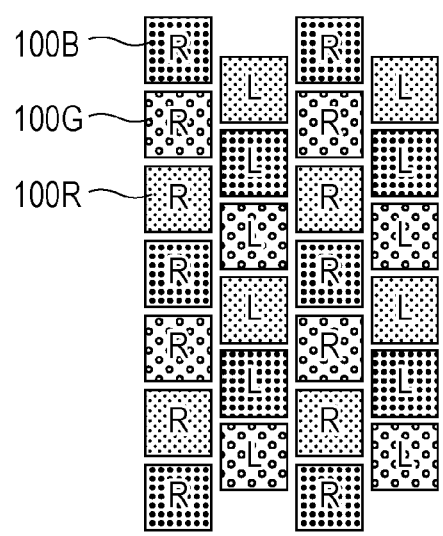
FIG. 8 is an illustration for explaining an arrangement of sub-pixels in a liquid crystal panel at the time of horizontal orientation.

When the stereoscopic display device 1 is horizontally oriented, the right-eye images R and the left-eye images L are alternately arranged along the horizontal direction (second direction) in FIG. 8. When viewed in the vertical direction (first direction), images corresponding to the same eye (the right-eye images R or the left-eye images L) are arranged along a straight line.

Figure 9:
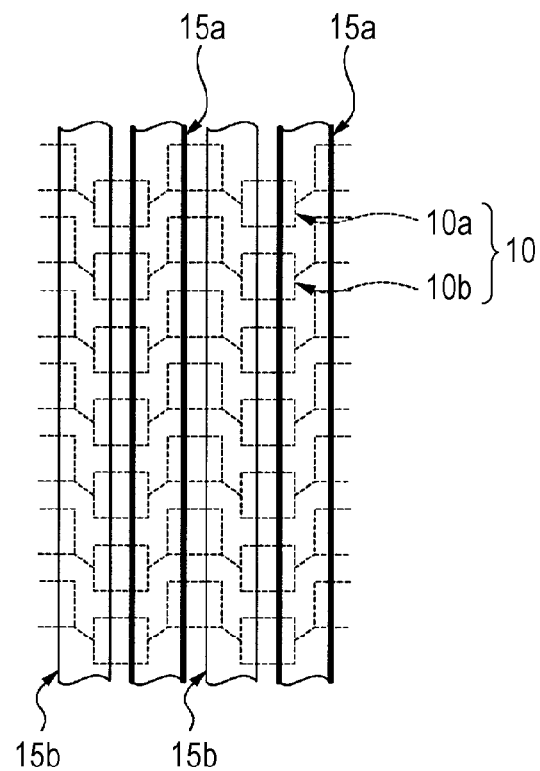
FIG. 9 is an illustration for explaining a driving state of a light shielding barrier at the time of horizontal orientation.
Figure 10:
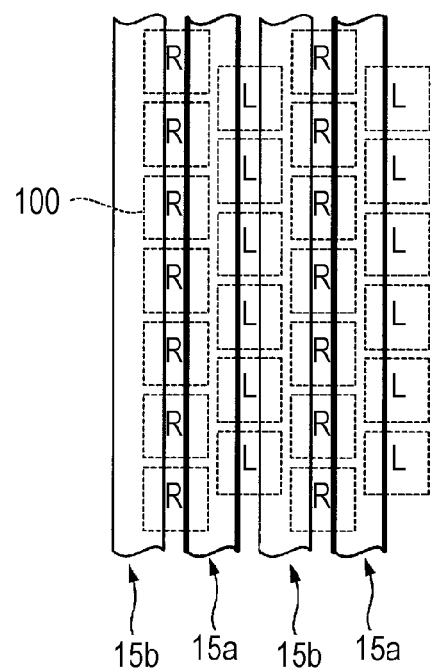
FIG. 10 illustrates a positional relationship between barrier openings and sub-pixels at the time of horizontal orientation.

FIG. 9 is an explanatory illustration of the driving state of the light shielding barrier 2 when the stereoscopic display device 1 is horizontally oriented. FIG. 10 illustrates the positional relationship between the barrier openings formed by the light shielding barrier 2 and the sub-pixels at the time of horizontal orientation.

When the stereoscopic display device 1 is horizontally oriented, the light shielding barrier 2 activates only the horizontal-orientation driving unit 41 on the glass substrate 12 side and also activates the vertical-orientation driving unit 21 and the horizontal-orientation driving unit 22 on the glass substrate 11 side. At this time, all the first electrodes 10 have the same potential. Hence, as illustrated in FIG. 9, a voltage can be applied across the horizontal-orientation driving electrode parts 15*a* on the glass substrate 12 side and the first electrodes 10. Note that since FIG. 9 is a schematic diagram, there are gaps between the vertical-orientation driving electrode parts 10*a* and the horizontal-orientation driving electrode parts 10*b* which form the first electrodes 10. However, since the actual gaps are very small, a voltage can be effectively applied between the first electrodes 10 and the horizontal-orientation driving electrode parts 15*a*. As a result, the polarization axis of the light polarized through the polarizing plate 14 is rotated by 90 degrees in accordance with the rotation of the liquid crystal in the liquid crystal layer 13 which is located between the horizontal-orientation driving electrode parts 15*a* and the first electrodes 10, and the light comes out through the polarizing plate 16. At this time, since no voltage is applied between the vertical-orientation driving electrode part 15*b* and the first electrodes 10, the polarization axis of the light selected by the polarizing plate 14 does not rotate in the liquid crystal layer 13, and hence, the light does not pass through the polarizing plate 16.

As a result, the barrier openings S formed by the light shielding barrier 2 are arranged in a stripe pattern corresponding to the pattern of the horizontal-orientation driving electrode part 15*a*, as illustrated in FIG. 10. Consequently, the right-eye images R and the left-eye images L displayed by the sub-pixels 100 can be sufficiently separated, thereby reliably enabling the viewer H to view the right-eye images R and the left-eye images L.

Thus, the light shielding barrier 2 allows only the right-eye images R to be incident to the right eye of the viewer H and allows only the left-eye images L to be incident to the left eye of the viewer H, thereby causing parallax to be generated between the two eyes and enabling the viewer H to view a stereoscopic image.

When the sub-pixel has a shape whose length and width are different from each other (i.e., rectangular shape) an appropriate viewing distance from the display device for the viewer H changes in accordance with whether a stereoscopic display device is oriented in the vertical direction or horizontal direction. Here, the appropriate viewing distance is a viewing distance which enables a viewer to view a high quality stereoscopic image. Hereinafter, this is examined with reference to FIG. 11.

Figure 11:
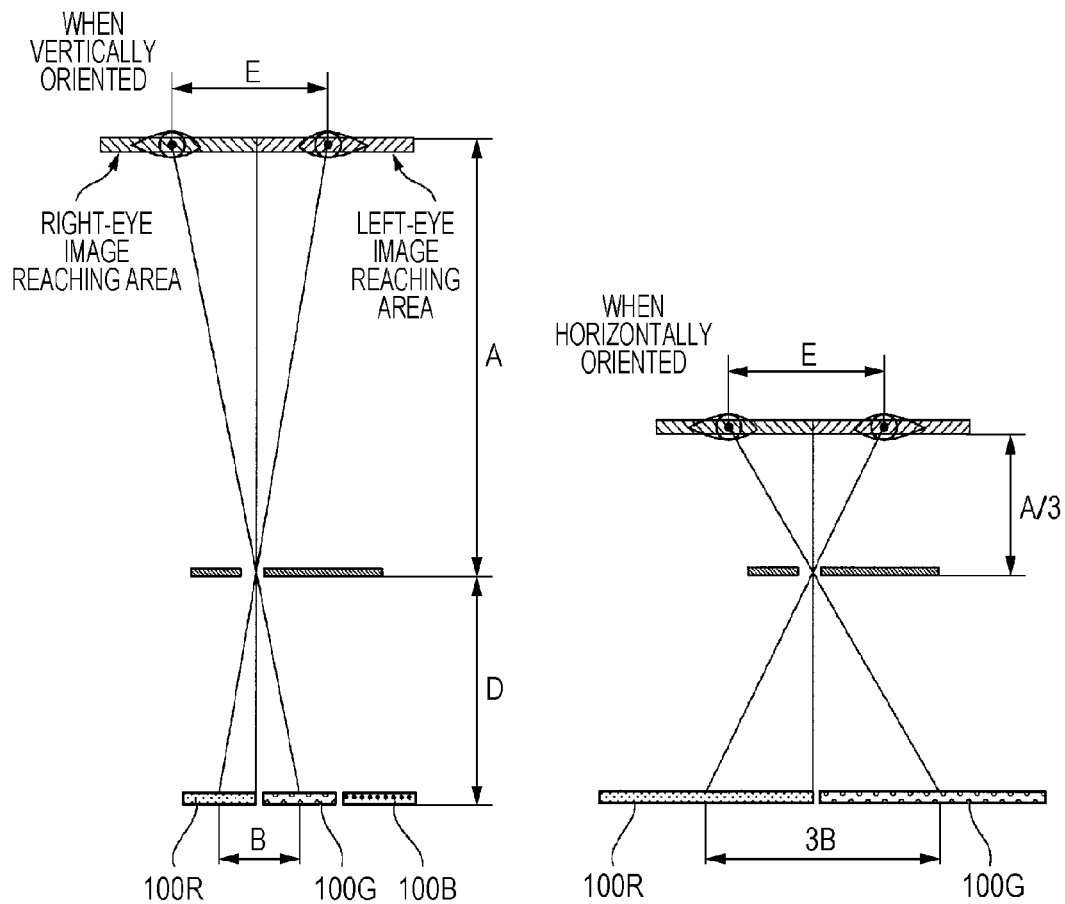
FIG. 11 is an illustration for explaining how an appropriate viewing distance changes in accordance with the time of vertical or horizontal orientation.

In FIG. 11, the distance between the eyes of the viewer H is E, the pitch of the sub-pixels 100R, 100G, and 100B is B, the distance between the light shielding barrier and the liquid crystal panel is d, and the appropriate viewing distance for the viewer H is A. It is assumed that the pitch of sub-pixels at the time of vertical orientation is, for example, three times the pitch B of the sub-pixels 100R, 100G, and 100B at the time of horizontal orientation. Then the relations represented by Equations (1) to (3) below are obtained.

$$B:D=E:A \quad (1)$$

$$BA=ED \quad (2)$$

$$3B:D=E:A/3 \quad (3)$$

That is, it is shown that the appropriate viewing distance for the viewer H when the stereoscopic display device is oriented in the vertical direction is ⅓ of that when the stereoscopic display device is oriented in the horizontal direction, resulting in a large difference in viewing distance. Hence, it is necessary for the viewer H to change the distance from a display device in accordance with the case of vertical orientation or horizontal orientation.

On the other hand, in the stereoscopic display device 1 according to the present embodiment, since the sub-pixels 100R, 100G, and 100B are substantially square-shaped, there is no change in the pitch of the sub-pixels 100R, 100G, and 100B between the cases of vertical orientation and horizontal orientation. In addition, since the barrier shapes corresponding to vertical orientation and horizontal orientation are set independently, the viewer H is able to view high quality stereoscopic images without changing the position for viewing stereoscopic images at the time of either vertical orientation or horizontal orientation.

In the description above, as the arrangement pattern of the sub-pixels 100R, 100G, and 100B of the liquid crystal panel 3, the case has been described in which the arrangement pattern of the sub-pixels 100R, 100G, and 100B of an odd-numbered line is the same as the arrangement pattern of an even-numbered line when viewed in the vertical direction. However, as illustrated in FIG. 12, an odd-numbered line and an even-numbered line may have the arrangement patterns of the sub-pixels 100R, 100G, and 100B different from each other.

Figure 12:
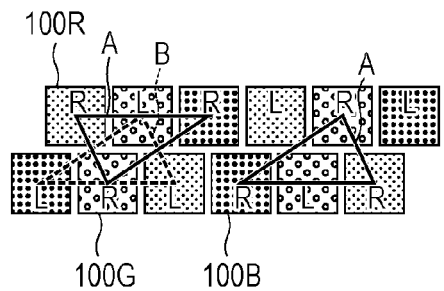
FIG. 12 illustrates a configuration of a sub-pixel arrangement pattern according to an exemplary modification.

In this case, the sub-pixels 100R, 100G, and 100B within an area denoted by a solid line A in FIG. 12 form one pixel for the right eye. The sub-pixels 100R, 100G, and 100B within an area denoted by a solid line B in FIG. 12 form one pixel for the left eye.

According to this configuration, compared with the sub-pixel pattern illustrated in FIG. 2, the sub-pixels 100R, 100G, and 100B forming one pixel for the right eye or the left eye are arranged in a shape closer to an equilateral triangle, making the sub-pixels closer to one another.

According to such sub-pixel arrangement, by using the light shielding barrier 2 described above, a high quality stereoscopic image can be viewed as a result of the viewer H viewing the high quality right-eye image L and the left-eye image L.

Electronic Apparatus

Figure 13:
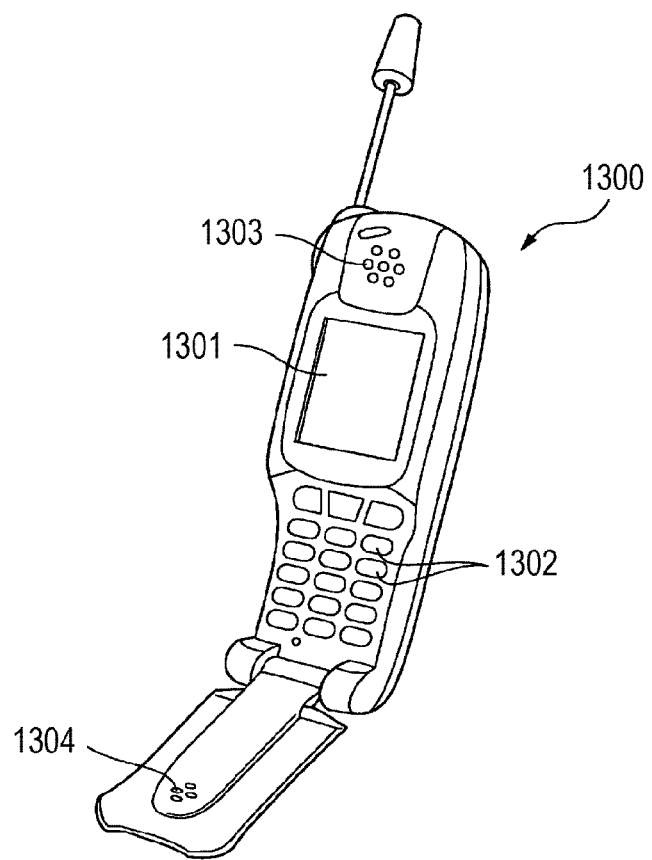
FIG. 13 illustrates a configuration of a cellular phone according to an embodiment of an electronic apparatus.

FIG. 13 is a perspective view of an exemplary electronic apparatus according to an embodiment. A cellular phone 1300 illustrated in the figure includes the display device according to an embodiment as a small size display unit 1301, a plurality of operation buttons 1302, an ear piece 1303, and a mouth piece 1304. Not limited to the above-described cellular phone, the display device of the above-described embodiment may be preferably used as image display means for various apparatuses, such as an electronic book, a personal computer, a digital still camera, a liquid crystal television, a video cassette recorder with a viewfinder or a monitor for viewing, a car navigation device, a pager, an electronic notebook, an electronic calculator, a word processor, a workstation, a picture phone, a POS terminal, and an apparatus with a touch panel. In any of these electronic apparatuses, a high quality stereoscopic image can be displayed, whereby highly reliable electronic apparatuses can be provided.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:
1. A display device comprising:
   image display means having a plurality of pixels each including a plurality of sub-pixels with colors different from one another, the sub-pixels displaying an image for a right eye and an image for a left eye; and
   light shielding means for causing parallax to be generated between the two eyes,
   wherein, in the image display means, each of the sub-pixels is square and arranged in such a manner as to correspond to a corresponding lattice point of a triangular lattice,
   wherein, in the light shielding means, a shape of a light shielding barrier in a state in which a display device body is oriented in a vertical direction is different from a shape of the light shielding barrier in a state in which the display device body is oriented in a horizontal direction, and
   wherein in the light shielding means, barrier openings forming the shape of the light shielding barrier in the vertical orientation state are arranged in a zigzag pattern, and barrier openings forming the shape of the light shielding barrier in the horizontal orientation state are arranged in a stripe pattern, and
   wherein the light shielding means includes:
      a first substrate;
      a second substrate;
      a liquid crystal layer sandwiched between the first and second substrates;
      a plurality of first electrodes provided on the first substrate, each of the plurality of first electrodes including a plurality of square-shaped electrodes which are arranged in a zigzag pattern and electrically connected to one another; and a plurality of second electrodes provided on the second substrate, each of the plurality of second electrodes including a rectangular electrode arranged in a stripe pattern.

2. The display device according to claim 1, wherein the plurality of sub-pixels are arranged in a line along a first direction and the line of sub-pixels is arranged in a plurality along a second direction perpendicular to the first direction, and wherein an arrangement pattern of the sub-pixels of an odd-numbered line is different from an arrangement pattern of an even-numbered line.

3. The display device according to claim 1, wherein a shape of each first electrode corresponds to the shape of the light shielding barrier in the vertical orientation state, and a shape of each second electrode corresponds to the shape of the light shielding barrier in the horizontal orientation state.

4. An electronic apparatus including the display device according to claim 1.

5. The display device according to claim 1, wherein in the light shielding means the barrier openings forming the shape of the light shielding barrier in the vertical orientation state are arranged in a zigzag pattern by applying a voltage alternately to the plurality of first electrodes, and the barrier openings forming the shape of the light shielding barrier in the horizontal orientation state are arranged in a stripe pattern by applying a voltage alternately to the plurality of second electrodes.

6. The display device according to claim 1, wherein in the light shielding means the plurality of first electrodes include first electrode group zigzag patterned subsets alternately arranged and alternately driven by different first electrode driving units to thereby form the zigzag shaped barrier openings in the vertical orientation state, and the plurality of second electrodes include second electrode group stripe patterned subsets alternately arranged and alternately driven by different second electrode driving units to thereby form the stripe shaped barrier openings in the horizontal orientation state.

7. A display device comprising:

an image display unit having a plurality of pixels each including a plurality of sub-pixels with colors different from one another, the sub-pixels displaying an image for a right eye and an image for a left eye; and a light shielding unit configured to cause parallax to be generated between the two eyes, wherein, in the image display unit, each of the sub-pixels is square and arranged in such a manner as to correspond to a corresponding lattice point of a triangular lattice, and wherein, in the light shielding unit, a shape of a light shielding barrier in a state in which a display device body is oriented in a vertical direction is different from a shape of the light shielding barrier in a state in which the display device body is oriented in a horizontal direction, and wherein in the light shielding unit, barrier openings forming the shape of the light shielding barrier in the vertical orientation state are arranged in a zigzag pattern, and barrier openings forming the shape of the light shielding barrier in the horizontal orientation state are arranged in a stripe pattern, and wherein the light shielding unit includes:

a first substrate;

a second substrate;

a liquid crystal layer sandwiched between the first and second substrates;

a plurality of first electrodes provided on the first substrate, each of the plurality of first electrodes including a plurality of square-shaped electrodes which are arranged in a zigzag pattern and electrically connected to one another; and a plurality of second electrodes provided on the second substrate, each of the plurality of second electrodes including a rectangular electrode arranged in a stripe pattern.

8. The display device according to claim 7, wherein in the light shielding means the barrier openings forming the shape of the light shielding barrier in the vertical orientation state are arranged in a zigzag pattern by applying a voltage alternately to the plurality of first electrodes, and the barrier openings forming the shape of the light shielding barrier in the horizontal orientation state are arranged in a stripe pattern by applying a voltage alternately to the plurality of second electrodes.

9. The display device according to claim 7, wherein in the light shielding means the plurality of first electrodes include first electrode group zigzag patterned subsets alternately arranged and alternately driven by different first electrode driving units to thereby form the zigzag shaped barrier openings in the vertical orientation state, and the plurality of second electrodes include second electrode group stripe patterned subsets alternately arranged and alternately driven by different second electrode driving units to thereby form the stripe shaped barrier openings in the horizontal orientation state.

* * * * *